United States Patent
Yoshida et al.

(10) Patent No.: US 9,034,480 B2
(45) Date of Patent: *May 19, 2015

(54) HOT-DIP AL—ZN COATED STEEL SHEET

(75) Inventors: Masahiro Yoshida, Tokyo (JP); Hiroki Nakamaru, Tokyo (JP)

(73) Assignee: JFE Steel Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/989,287

(22) PCT Filed: Nov. 25, 2011

(86) PCT No.: PCT/JP2011/077882
§ 371 (c)(1),
(2), (4) Date: May 23, 2013

(87) PCT Pub. No.: WO2012/070695
PCT Pub. Date: May 31, 2012

(65) Prior Publication Data
US 2013/0295411 A1    Nov. 7, 2013

(30) Foreign Application Priority Data

Nov. 26, 2010  (JP) .................................. 2010-263211

(51) Int. Cl.
*C23C 2/06* (2006.01)
*C23C 2/12* (2006.01)
(Continued)

(52) U.S. Cl.
CPC . *C23C 2/06* (2013.01); *B32B 15/04* (2013.01); *B32B 15/18* (2013.01); *B32B 15/20* (2013.01);
(Continued)

(58) Field of Classification Search
CPC ........ B32B 15/04; B32B 15/18; B32B 15/20; C23C 2/06; C23C 2/12; C23C 8/14; C23C 28/345; C23C 28/321; C23C 28/3225; C23C 8/18; C23C 28/322; C23C 28/30; C23C 30/00; C23C 30/005; Y10T 428/12799; Y10T 428/12757

USPC ......... 428/653, 650, 652, 632, 633, 628, 629, 428/630, 631, 639, 640, 658, 659, 684, 685
See application file for complete search history.

(56) References Cited

U.S. PATENT DOCUMENTS

2009/0053555 A1 * 2/2009 Nose et al. .................... 428/653
2010/0065160 A1   3/2010 Meurer
(Continued)

FOREIGN PATENT DOCUMENTS

JP      46-7161      3/1971
JP    51149832     12/1976
(Continued)

OTHER PUBLICATIONS

International Search Report dated Feb. 21, 2012, application No. PCT/JP2011/077882.
(Continued)

*Primary Examiner* — Michael E La Villa
(74) *Attorney, Agent, or Firm* — RatnerPrestia

(57) ABSTRACT

There is provided a hot-dip Al—Zn coated steel sheet that has a steel sheet containing Si and Mn as a base steel sheet and has excellent coating appearance and corrosion resistance. The Al—Zn coating layer has an Al content in the range of 20% to 95% by mass. The Al—Zn coating layer has a Ca content in the range of 0.01% to 10% by mass. Alternatively, the Ca and Mg content is in the range of 0.01% to 10% by mass. A steel sheet surface layer within 100 μm from a surface of the base steel sheet directly under the Al—Zn coating layer contains 0.06 to 1.0 g/m² per surface of an oxide of at least one selected from Fe, Si, Mn, Al, P, B, Nb, Ti, Cr, Mo, Cu, and Ni in total.

5 Claims, 2 Drawing Sheets

LARGE SHEET (150 mm x 70 mm): GALVANNEALED STEEL SHEET
SMALL SHEET (110 mm x 40 mm): STEEL SHEET TO BE TESTED

(51) Int. Cl.
  *B32B 15/04* (2006.01)
  *B32B 15/18* (2006.01)
  *B32B 15/20* (2006.01)
  *C23C 30/00* (2006.01)
  *C23C 28/00* (2006.01)
  *C23C 8/14* (2006.01)
  *C23C 8/18* (2006.01)

(52) U.S. Cl.
  CPC .. *Y10T 428/12799* (2013.01); *Y10T 428/12757* (2013.01); *C23C 30/005* (2013.01); *C23C 28/322* (2013.01); *C23C 2/12* (2013.01); *C23C 8/14* (2013.01); *C23C 8/18* (2013.01); *C23C 28/321* (2013.01); *C23C 28/3225* (2013.01); *C23C 28/345* (2013.01)

(56) References Cited

U.S. PATENT DOCUMENTS

| | | | | |
|---|---|---|---|---|
| 2011/0217569 | A1* | 9/2011 | Fushiwaki et al. | 428/659 |
| 2013/0236739 | A1* | 9/2013 | Yoshida et al. | 428/653 |

FOREIGN PATENT DOCUMENTS

| | | |
|---|---|---|
| JP | 55-122865 | 9/1980 |
| JP | 4009456 | 1/1992 |
| JP | 7216524 | 8/1995 |
| JP | 10053893 | 2/1998 |
| JP | 10-158784 A | 6/1998 |
| JP | 2001-316791 A | 11/2001 |
| JP | 2002-129300 A | 5/2002 |
| JP | 2005272967 | 10/2005 |
| JP | 2006-283155 A | 10/2006 |
| JP | 2008045203 | 2/2008 |
| JP | 2009-293118 A | 12/2009 |
| JP | 2010501725 | 1/2010 |
| JP | 2001192795 | 7/2011 |
| WO | WO 2010/061957 * | 6/2010 |

OTHER PUBLICATIONS

International Search Report dated Feb. 21, 2012 in PCT/JP2011/077880.

Entire patent prosecution history of U.S. Appl. No. 13/989,515, filed May 24, 2013, entitled, "Hot-Dip Al—Zn Coated Steel Sheet and Method for Manufacturing the Same."

* cited by examiner

HOT-DIP AL—ZN COATED STEEL SHEET

CROSS REFERENCE TO RELATED APPLICATIONS

This application is the U.S. National Phase application of PCT International Application No. PCT/JP2011/077882, filed Nov. 25, 2011, and claims priority to Japanese Patent Application No. 2010-263211, filed Nov. 26, 2010, the disclosures of both applications being incorporated herein by reference in their entireties for all purposes.

FIELD OF THE INVENTION

The present invention relates to a hot-dip Al—Zn coated steel sheet that has a steel sheet containing Si and Mn as a base steel sheet and has excellent coating appearance and corrosion resistance and, more particularly, to a hot-dip Al—Zn coated steel sheet having excellent coating appearance and joint corrosion resistance.

BACKGROUND OF THE INVENTION

Hot-dip Al—Zn coated steel sheets that contain 20% to 95% by mass of Al in the coating layer have higher corrosion resistance than hot-dip galvanized steel sheets, as described in Patent Literature 1.

In general, hot-dip Al—Zn coated steel sheets are manufactured by recrystallization annealing and hot-dip coating treatment of a base steel sheet in an annealing furnace on a continuous hot-dip line. The base steel sheet is a thin steel sheet manufactured by hot rolling or cold rolling of a slab. The Al—Zn coating layer includes an alloy phase at an interface between the Al—Zn coating layer and the base steel sheet and an upper layer disposed on the alloy phase. The upper layer includes one portion that mainly contains supersaturated Zn and in which Al is dendritically solidified and another portion between the dendrites. The dendritic solidification portion has a layered structure in the thickness direction of the coating layer. Such a characteristic layer structure makes a corrosion evolutionary path from the surface more complex and makes it difficult for corrosion to reach the base steel sheet. Thus, hot-dip Al—Zn coated steel sheets have higher corrosion resistance than hot-dip galvanized steel sheets that include a coating layer having the same thickness.

There is a growing demand for such corrosion-resistant hot-dip Al—Zn coated steel sheets particularly in the field of construction materials, such as those for roofs and walls, that are exposed to the outdoors for a long period of time, and such steel sheets have also recently been used in the automotive field. However, use of hot-dip Al—Zn coated steel sheets in the automotive field has the following problems.

In the automotive field, it is required to improve mileage by reducing the weight of automobile bodies to decrease $CO_2$ emissions as part of measures against global warming. Thus, there is a strong demand for weight reduction by the use of high-strength steel sheets and gauge reduction by improving the corrosion resistance of steel sheets. However, hot-dip Al—Zn coating treatment of a high-strength steel sheet that contains a large amount of an oxidizable solid-solution strengthening element, such as Si or Mn, results in the formation of an uncoated portion, that is, poor coatability, which results in poor coating appearance. This results from the fact that the reducing atmosphere for reducing Fe in an annealing furnace becomes an oxidizing atmosphere for an oxidizable solid-solution strengthening element, such as Si or Mn, in a steel sheet. More specifically, an oxidizable element Si or Mn undergoes selective surface oxidation (hereinafter referred to as surface enrichment) on the surface of a steel sheet in an annealing process, thereby markedly lowering the wettability of the steel sheet to molten metal.

As a method for hot-dip coating of a steel sheet containing Al, Si, and Mn in a non-oxidizing furnace, Patent Literature 2 discloses a hot-dip coating method for oxidizing a surface of the steel sheet such that the oxide film thickness is in the range of 400 to 10,000 angstroms and then annealing the steel sheet in an atmosphere containing hydrogen.

In general, when used in the automotive field, hot-dip coated steel sheets are supplied to automobile manufacturers after coating with continuous hot-dip coating equipment. The hot-dip coated steel sheets are processed and joined into the shapes of automotive body components and are then subjected to chemical conversion treatment and electrodeposition coating. Thus, when used in the automotive field, the joined portions inevitably include a joint at which steel sheets overlap each other. The joint cannot be easily subjected to chemical conversion treatment or electrodeposition coating and therefore has lower perforation corrosion resistance than portions appropriately subjected to chemical conversion treatment and electrodeposition coating. Thus, there is a problem that the joint has low corrosion resistance.

As a corrosion-resistant coated steel sheet, for example, Patent Literature 3 discloses a hot-dip Al alloy coated steel having a coating layer that contains 1% by atom or more and 30% by atom or less of one or two or more elements selected from an element group X in total and a remainder of Al and incidental impurities. The element group X includes {Ni, an element group A (which includes La, Ce, and Y) and Ca}. Ni is 0.5% by atom or more and 15% by atom or less. An element selected from the element group A is 0.5% by atom or more and 10% by atom or less, and Ca is 0.5% by atom or more and 15% by atom or less. When both an element selected from the element group A and Ca are contained, the amount of each element is not more than 5% by atom.

In recent years, high-strength hot-dip coated steel sheets manufactured by performing hot-dip coating of high-strength steel sheets, for example, as disclosed in Patent Literature 2 have increasingly been used after advanced processing, such as 90° bend or 2T bend. Thus, high-strength hot-dip coated steel sheets need to have high peel resistance of coating in advanced processing and corrosion resistance after advanced processing. However, the high-strength hot-dip coated steel sheet disclosed in Patent Literature 2 has insufficient peel resistance of coating in advanced processing and corrosion resistance after advanced processing.

Although Al—Zn coated steel sheets not subjected to heat treatment for alloying after coating as disclosed in Patent Literature 3 have high peel resistance of coating after advanced processing, the presence of a dendrite structure of an α-Al phase prevents the formation of uniform cracks on the entire coating layer in the advanced processing and causes deterioration in corrosion resistance after the advanced processing. More specifically, the concentration of cracks in an interspace of the dendrite structure decreases the number of cracks and increases the width of each crack. This causes partial corrosion of the coating layer and deterioration in corrosion resistance after advanced processing.

Patent Literature

PTL 1: Japanese Examined Patent Application Publication No. 46-7161

PTL 2: Japanese Unexamined Patent Application Publication No. 55-122865

PTL 3: Japanese Unexamined Patent Application Publication No. 2009-293118

SUMMARY OF THE INVENTION

In view of the situations described above, the present invention provides a hot-dip Al—Zn coated steel sheet that has a steel sheet containing Si and Mn as a base steel sheet and has excellent coating appearance, corrosion resistance after advanced processing, and joint corrosion resistance.

As a result of extensive studies to solve the problems of coatability (the formation of an uncoated portion) described above, the present inventors found that a hot-dip Al—Zn coated steel sheet that has a decreased area of uncoated portion, high corrosion resistance after advanced processing, and an excellent coating appearance could be manufactured, for example, by forcing a steel sheet to be oxidized at high oxygen potential (hereinafter also referred to as pre-oxidation) and then reducing the steel sheet in a heating step before coating treatment to form 0.06 to 1.0 g/m$^2$ per surface of an oxide of at least one selected from Fe, Si, Mn, Al, P, B, Nb, Ti, Cr, Mo, Cu, and Ni in a steel sheet surface layer within 100 μm from the surface of the base steel sheet directly under the Al—Zn coating layer.

As a result of extensive studies to solve the problems of joint corrosion resistance, the present inventors found that the inclusion of Ca or Ca and Mg in an Al—Zn coating layer could achieve unprecedentedly excellent corrosion resistance. More specifically, the coating layer contains 0.01% to 10% by mass of Ca or Ca and Mg. The inclusion of 0.01% to 10% by mass of Ca or Ca and Mg allows these elements to be contained in a corrosion product formed on a joint. This can stabilize the corrosion product, retard subsequent development of corrosion, and provide excellent joint corrosion resistance.

The present inventors also found that the Ca/Zn mass ratio, the Zn content, and the Al content of the Al—Zn coating layer could be optimized to achieve unprecedentedly further excellent corrosion resistance after advanced processing.

The present invention is based on these findings and has the following characteristics according to an exemplary embodiment.

[1] A hot-dip Al—Zn coated steel sheet that includes an Al—Zn coating layer having an Al content in the range of 20% to 95% by mass on a surface of the steel sheet, wherein the Al—Zn coating layer contains 0.01% to 10% by mass of Ca, and a steel sheet surface layer within 100%μm from a surface of a base steel sheet directly under the Al—Zn coating layer contains 0.06 to 1.0 g/m$^2$ per surface of an oxide of at least one selected from Fe, Si, Mn, Al, P, B, Nb, Ti, Cr, Mo, Cu, and Ni in total.

[2] A hot-dip Al—Zn coated steel sheet that includes an Al—Zn coating layer having an Al content in the range of 20% to 95% by mass on a surface of the steel sheet, wherein the Al—Zn coating layer contains 0.01% to 10% by mass of Ca and Mg in total, and a steel sheet surface layer within 100 μm from a surface of a base steel sheet directly under the Al—Zn coating layer contains 0.06 to 1.0 g/m$^2$ per surface of an oxide of at least one selected from Fe, Si, Mn, Al, P, B, Nb, Ti, Cr, Mo, Cu, and Ni in total.

[3] The hot-dip Al—Zn coated steel sheet according to [1] or [2], wherein the mass ratio of Ca to Zn (Ca/Zn) in the Al—Zn coating layer is 0.5 or less.

[4] The hot-dip Al—Zn coated steel sheet according to any one of [1] to [3], wherein the Al—Zn coating layer has a Zn content of 10% by mass or more.

[5] The hot-dip Al—Zn coated steel sheet according to any one of [1] to [4], wherein the Al—Zn coating layer has an Al content in the range of 45% to 85% by mass.

A hot-dip Al—Zn coated steel sheet according to the present invention is preferably applied to a high-strength steel sheet having a tensile strength TS of 340 MPa or more. Whether subjected to alloying treatment or not, a steel sheet coated with Al—Zn by a coating treatment method is herein collectively referred to as a hot-dip Al—Zn coated steel sheet. Thus, a hot-dip Al—Zn coated steel sheet in the present invention includes both a hot-dip Al—Zn coated steel sheet that is not subjected to alloying treatment and a hot-dip Al—Zn coated steel sheet that is subjected to alloying treatment.

The present invention can provide a hot-dip Al—Zn coated steel sheet that has excellent coating appearance, corrosion resistance, particularly joint corrosion resistance, and corrosion resistance after advanced processing. The application of a hot-dip Al—Zn coated steel sheet according to the present invention to a high-strength steel sheet can achieve both weight reduction and excellent corrosion resistance in the automotive field.

DETAILED DESCRIPTION OF EMBODIMENTS OF THE INVENTION

Figure 1:
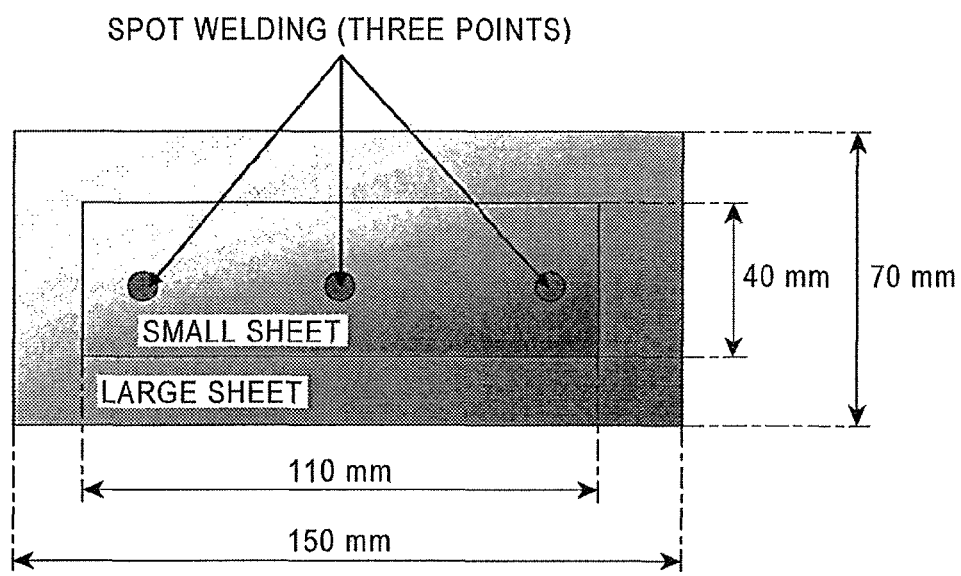
FIG. 1 is a schematic view of a joined material test specimen. (Example 1)

The present invention will be further described below with reference to exemplary embodiments.

First, the structure of the surface of the base steel sheet directly under the Al—Zn coating layer, which is the most important requirement in the present invention, will be described below.

In a hot-dip Al—Zn coated steel sheet according to an embodiment of the present invention, a steel sheet surface layer within 100 μm from the surface of the base steel sheet directly under the Al—Zn coating layer contains 0.06 to 1.0 g/m$^2$ per surface of an oxide of at least one selected from Fe, Si, Mn, Al, P, B, Nb, Ti, Cr, Mo, Cu, and Ni.

In order to achieve satisfactory coatability in a hot-dip Al—Zn coated steel sheet in which Si and a large amount of Mn are added into the steel, it is necessary to reduce the surface enrichment of an oxidizable element, such as Si or Mn, that causes deterioration in coatability and coating adhesion in an annealing process. In order to improve corrosion resistance after advanced processing, such as 90° bending or 2T bending, it is necessary to develop an appropriate number of cracks uniformly on the entire coating layer in advanced processing. Thus, the present invention improves both coatability and corrosion resistance after advanced processing by causing internal oxidation of an oxidizable element, such as Si or Mn, within 100 μm from a surface of the base steel sheet to reduce the surface enrichment of these elements and subsequently forming an Al—Zn coating layer having an optimized composition. The internal oxidation of an oxidizable element, such as Si or Mn, to reduce the surface enrichment of the oxidizable element improves coatability. The corrosion resistance after advanced processing is improved by propagating cracks that develop from a point in the vicinity of an internal oxide in advanced processing to the coating layer and even the inside of the dendrite structure of an α-Al phase, thereby developing an appropriate number of cracks uniformly on the entire coating layer. These effects can be observed by controlling the amount of internal oxide of at least one selected from Fe, Si, Mn, Al, P, B, Nb, Ti, Cr, Mo, Cu, and Ni within 0.06 to 1.0 g/m² in total in the steel sheet surface layer within 100 μm from the surface of the base steel sheet. When the total amount of oxide formed (hereinafter referred to as the amount of internal oxidation) is less than 0.06 g/m², the surface enrichment of an oxidizable element, such as Si or Mn, cannot be prevented, and coatability deteriorates. 0.06 g/m² or more results in an appropriate number of cracks developed uniformly on the entire coating layer. Thus, the lower limit is 0.06 g/m², at which coatability can also be satisfied. On the other hand, more than 1.0 g/m² results in an increase in the number of cracks that develops from a point in the vicinity of an internal oxide in processing. Thus, the steel sheet surface layer containing the coating layer may entirely peel off. Thus, the amount of internal oxidation is in the range of 0.06 to 1.0 g/m².

As a method for causing internal oxidation of an oxidizable element, such as Si or Mn, within 100 μm from the surface of the base steel sheet to reduce the surface enrichment of these elements in the present invention, for example, a steel sheet is forced to be oxidized in an atmosphere having high oxygen potential due to $O_2$ gas and is then subjected to reduction annealing in a heating step.

First, in a pre-oxidation process, control for increasing oxygen potential with $O_2$ gas is performed to oxidize Fe, forming an Fe oxide film on the top layer of the steel sheet. In the subsequent reduction annealing, the Fe film is reduced to form a clean active reduced Fe on the top layer of the steel sheet. Simultaneously with the reduction of Fe, the oxidizable element, such as Si or Mn, reacts with O produced by the reduction of the Fe oxide film in the inside of the surface layer of the steel sheet to undergo internal oxidation. This reduces the surface enrichment of the oxidizable element, such as Si or Mn, and consequently improves coatability.

In the present invention, in the heating step, after a pre-oxidation process for controlling a temperature region having an annealing furnace internal temperature of 400° C. or more and 900° C. or less to have an atmosphere containing 0.01% by volume or more and 20% by volume or less of $O_2$, reduction annealing is preferably performed such that a temperature region having an annealing furnace internal temperature of 600° C. or more and 950° C. or less is controlled to have a $H_2$—$N_2$ gas atmosphere that has a dew point of −60° C. or more and 10° C. or less and that contains 3% by volume or more of $H_2$.

More specifically, during annealing and hot-dip Al—Zn coating treatment in continuous hot-dip coating equipment, in the pre-oxidation process in the heating step, a temperature region having an annealing furnace internal temperature of 400° C. or more and 900° C. or less is controlled to have an atmosphere containing 0.01% by volume or more and 20% by volume or less of $O_2$, forming an Fe oxide film on a surface of the base steel sheet at 0.03 to 2.0 g/m² per surface based on the amount of O. 90% by mass or more of the constituent elements of the oxide film are Fe and O. After the pre-oxidation process, a temperature region having an annealing furnace internal temperature of 600° C. or more and 950° C. or less in the heating step is controlled to have a $H_2$—$N_2$ gas atmosphere that has a dew point of −60° C. or more and 10° C. or less and that contains 3% by volume or more of $H_2$, thus reducing the Fe oxide film to form an active reduced Fe on the top layer of the steel sheet. Simultaneously, an oxidizable element, such as Si or Mn, is subjected to internal oxidation in the steel sheet within 100 μm of the steel sheet surface layer. After subsequent coating treatment, the resulting hot-dip Al—Zn coated steel sheet contains 0.06 to 1.0 g/m² per surface of an oxide of at least one selected from Fe, Si, Mn, Al, P, B, Nb, Ti, Cr, Mo, Cu, and Ni on a surface of the steel sheet within 100 μm from the surface of the base steel sheet directly under the coating layer.

Preferably, the atmosphere in the pre-oxidation process of the temperature region having an annealing furnace internal temperature of 400° C. or more and 900° C. or less contains 0.01% by volume or more and 20% by volume or less of $O_2$, 1% to 50% by volume of $H_2O$, and a remainder of one or two or more of $N_2$, CO, and $CO_2$ and incidental impurities. Less than 0.01% by volume of $O_2$ concentration in the atmosphere makes it impossible to oxidize Fe. More than 20% by volume results in high cost. Preferably, $H_2O$ is 1% by volume or more to promote oxidation. 50% by volume or less is preferred in view of humidification cost.

Preferably, the temperature region in the pre-oxidation process is limited as described below. A furnace internal temperature of less than 400° C. results in negligible oxidation of Fe and no pre-oxidation effect, makes it impossible to prevent the surface enrichment of an oxidizable element, such as Si or Mn, and causes deterioration in coatability. On the other hand, more than 900° C. results in peroxidation, which may result in the presence of an insufficiently reduced Fe oxide film in a reduction annealing process after pre-oxidation and the occurrence of roll marks by the pickup of peroxidized Fe on a hearth roll. Thus, the temperature region in pre-oxidation preferably has an annealing furnace internal temperature of 400° C. or more and 900° C. or less.

Preferably, the amount of Fe oxide film formed on a surface of the base steel sheet by the pre-oxidation process, 90% or more of the constituent elements of which are Fe and O, is limited to the range of 0.03 to 2.0 g/m² per surface based on the amount of O. Also because of the reason for limiting the temperature region of pre-oxidation, when the amount of oxidation is less than 0.03 g/m², the surface enrichment of an oxidizable element, such as Si or Mn, cannot be prevented, and coatability deteriorates. On the other hand, when the amount of oxidation is more than 2.0 g/m² (peroxidation), this may result in the presence of an insufficiently reduced Fe oxide film in a reduction annealing process after pre-oxidation and the occurrence of roll marks by the pickup of peroxidized Fe on a hearth roll. Thus, 0.03 to 2.0 g/m² is preferred.

In the reduction annealing after the pre-oxidation process, a temperature region having an annealing furnace internal temperature of 600° C. or more and 950° C. or less is controlled in a $H_2$—$N_2$ gas atmosphere that has a dew point of −60° C. or more and 10° C. or less and that contains 3% by volume or more of $H_2$, thus reducing the Fe oxide film to form an active reduced Fe on the top layer of the steel sheet and simultaneously causing internal oxidation of an oxidizable element, such as Si or Mn, within 100 μm of the steel sheet surface layer.

A dew point of less than −60° C. or a furnace internal temperature of more than 950° C. results in excessive reduction of Fe oxide and the surface enrichment of an oxidizable element, such as Si or Mn, causing deterioration in coatability. A dew point of more than 10° C., a $H_2$ concentration of less than 3% by volume, or a temperature of less than 600° C. results in a decreased amount of reduced Fe oxide and the presence of an unreduced substance, which causes the formation of an uncoated portion. The reduction annealing treatment time after the pre-oxidation process is preferably 5 seconds or more. Less than 5 seconds results in a decreased amount of reduced Fe oxide and the presence of an unreduced substance, which causes the formation of an uncoated portion.

The atmosphere and temperature of the annealing heating step are appropriately controlled to promote the internal oxidation and minimize the surface enrichment of an oxidizable element, such as Si or Mn, thereby providing a hot-dip Al—Zn coated steel sheet that has excellent coating appearance and corrosion resistance after advanced processing. The term "excellent coating appearance" refers to an appearance having no uncoated portion.

Another example of a method for causing internal oxidation of an oxidizable element, such as Si or Mn, within 100 μm from a surface of the base steel sheet to reduce the surface enrichment of these elements in the present invention is to perform reduction annealing in an atmosphere having a high dew point in the heating step.

In the present invention, in the heating step, heating is preferably performed while a temperature region having an annealing furnace internal temperature of 650° C. or more in the heating step is controlled to have a $H_2$—$N_2$ gas atmosphere that has a dew point of −10° C. or more and 10° C. or less and that contains 3% by volume or more of $H_2$.

In the heating step, reduction annealing in an atmosphere having a high dew point allows the formation of 0.06 to 1.0 g/m² per surface of an oxide of at least one selected from Fe, Si, Mn, Al, P, B, Nb, Ti, Cr, Mo, Cu, and Ni on a surface of the steel sheet within 100 μm from the surface of the base steel sheet directly under the coating layer.

First, in the heating step, a $H_2$—$N_2$ reducing atmosphere is humidified with $H_2O$ so as to have a high dew point. This allows $H_2O$ to be decomposed to produce $O_2$ at a furnace internal temperature as high as 600° C. or more in a reducing atmosphere in which a surface of the steel sheet, that is, Fe is not oxidized. The resulting $O_2$ diffuses into the steel sheet and reacts with an oxidizable element, such as Si or Mn, in the steel sheet within 100 μm of a steel sheet surface layer. In other words, $O_2$ produced by the decomposition of $H_2O$ in the high temperature reducing atmosphere causes internal oxidation of an oxidizable element, such as Si or Mn, in the steel sheet within 100 μm of the steel sheet surface layer. This reduces the surface enrichment of the oxidizable element, such as Si or Mn, and consequently improves coatability.

More specifically, in annealing and hot-dip Al—Zn coating treatment in continuous hot-dip coating equipment, the temperature region having an annealing furnace internal temperature of 650° C. or more in the heating step is required to cause internal oxidation of an oxidizable element, such as Si or Mn, in the steel sheet within 100 μm of the steel sheet surface layer while the temperature region is controlled to have a $H_2$—$N_2$ gas atmosphere that has a dew point of −10° C. or more and 10° C. or less and that contains 3% by volume or more of $H_2$. After subsequent coating treatment, the resulting hot-dip Al—Zn coated steel sheet contains 0.06 to 1.0 g/m² per surface of an oxide of at least one selected from Fe, Si, Mn, Al, P, B, Nb, Ti, Cr, Mo, Cu, and Ni on a surface of the steel sheet within 100 μm from the surface of the base steel sheet directly under the coating layer.

The following is the reason for limiting the atmosphere of the temperature region having an annealing furnace internal temperature of 650° C. or more. Less than 3% by volume of $H_2$ has low reducing effect and results in insufficient reduction of a natural oxidation film, that is, Fe oxide on a surface of the steel sheet, forming an uncoated portion. Thus, $H_2$ is 3% by volume or more. Although the reducing effect can effectively be increased with increasing $H_2$ amount, the cost also increases. Thus, less than 15% by volume is desirable.

A dew point of less than −10° C. results in an oxygen potential that is insufficient for internal oxidation of an oxidizable element. On the other hand, a dew point of more than 10° C. may promote the oxidation of Fe or the deterioration of a furnace wall because of the condensation of $H_2O$. Thus, it is desirable that the dew point be −10° C. or more and 10° C. or less. −5° C. or more is more desirable.

The reason that the temperature range in which the atmosphere is controlled at a high dew point is an annealing furnace internal temperature of 650° C. or more is that the internal oxidation of Si or Mn occurs at 650° C. or more. In order to increase the amount of internal oxide, it is desirable that the starting temperature of internal oxidation be added to the temperature range to be controlled. Although the control of the high dew point at a temperature of less than 650° C. does not affect the characteristics of the resulting coated steel sheet, a wider temperature range to be controlled makes operation more difficult. Thus, the lower limit of the temperature range to be controlled at a high dew point is 650° C., which is the starting temperature of internal oxidation.

The amount of internal oxide in the present invention refers to the amount of internal oxidation (O oxygen equivalent amount) and can be measured by an "impulse furnace fusion-infrared absorption method". The amount of internal oxidation within 100 μm of a steel sheet surface layer is calculated by subtracting the oxygen content of a material (steel sheet) from the total amount of oxidation in the thickness direction of the steel sheet. In the present invention, therefore, the oxygen concentration of steel is measured after polishing of 100 μm of the surface layers on both faces of a high-strength steel sheet after annealing. The measured value is assumed to be the oxygen content $O_H$ of the material. The total oxygen concentration of steel in the thickness direction of the steel sheet after annealing is measured and is assumed to be the oxygen content $O_I$ after internal oxidation. The oxygen content $O_I$ after internal oxidation of the steel sheet and the oxygen content $O_H$ of the material are used to calculate a difference between $O_I$ and $O_H$ ($=O_I-O_H$). The difference is converted into a value per surface unit area (that is, 1 m²) (g/m²), which is assumed to be the amount of internal oxidation. The preparation of a calibration curve in advance allows the quantification of O with fluorescent X-rays in a simplified manner. Any other method that can determine the amount of internal oxidation may be used.

A steel composition suitable for a hot-dip Al—Zn coated steel sheet according to an embodiment of the present invention will be described below. Although not particularly limited, in order to ensure stable manufacturing and satisfactory processability of manufactured coated steel sheets in automotive applications, the following steel compositions are preferred.

In the following, the unit of each element content of the steel composition and the unit of each content of the coating layer are "% by mass", which is simply expressed by "%" unless otherwise specified.

C: 0.01% to 0.18%

C improves processability by forming martensite as a steel structure. To this end, 0.01% or more is preferred. However, more than 0.18% may cause deterioration in weldability. Thus, the C content is preferably 0.01% or more and 0.18% or less.

Si: 0.001% to 2.0%

Si is an element that is effective in strengthening steel and achieving good material processability. 0.001% or more is preferred to achieve both high strength and processability. Less than 0.001% of Si sometimes cannot achieve high strength. On the other hand, more than 2.0% may make it difficult to improve the peel resistance of coating in advanced processing. Thus, the Si content is preferably 0.001% or more and 2.0% or less.

Mn: 0.1% to 3.0%

Mn is an element that is effective in strengthening steel. In order to ensure excellent mechanical characteristics and strength, the content of 0.1% or more is preferred. However, more than 3.0% may make it difficult to ensure weldability, coating adhesion, and a balance between strength and ductility. Thus, the Mn content is preferably 0.1% or more and 3.0% or less.

Al: 0.001% to 1.0%

Al is added for the purpose of deoxidation of molten steel. The Al content of less than 0.001% rarely achieves this purpose. 0.001% or more ensures the effect of deoxidation of molten steel. However, more than 1.0% may increase costs. Thus, the Al content is preferably 0.001% or more and 1.0% or less.

P: 0.005% to 0.060% or less

P is one of incidental impurities. Reduction to less than 0.005% may increase costs. Thus, 0.005% or more is preferred. However, more than 0.060% of P may cause deterioration in weldability, surface quality, or coating adhesion. Thus, the P content is preferably 0.005% or more and 0.060% or less.

S≤0.01%

S is one of incidental impurities. Although the lower limit is not particularly limited, a high content may cause deterioration in weldability. Thus, 0.01% or less is preferred.

In order to control the balance between strength and ductility, one or more elements selected from B: 0.001% to 0.005%, Nb: 0.005% to 0.05%, Ti: 0.005% to 0.05%, Cr: 0.001% to 1.0%, Mo: 0.05% to 1.0%, Cu: 0.05% to 1.0%, and Ni: 0.05% to 1.0% may be added if necessary. The reasons for limiting the appropriate amounts of these elements to be added are described below.

B: 0.001% to 0.005%

Less than 0.001% of B rarely achieves a quenching promoting effect. On the other hand, more than 0.005% causes deterioration in coating adhesion. Thus, if present, the B content is 0.001% or more and 0.005% or less.

Nb: 0.005% to 0.05%

Less than 0.005% of Nb has little effect of strength adjustment. Less than 0.005% of Nb in combination with Mo has little effect of improving coating adhesion. On the other hand, more than 0.05% results in an increase in cost. Thus, if present, the Nb content is 0.005% or more and 0.05% or less.

Ti: 0.005% to 0.05%

Less than 0.005% of Ti has little effect of strength adjustment. On the other hand, more than 0.05% causes deterioration in coating adhesion. Thus, if present, the Ti content is 0.005% or more and 0.05% or less.

Cr: 0.001% to 1.0%

Less than 0.001% of Cr rarely achieves a quenching effect. On the other hand, more than 1.0% of Cr undergoes surface enrichment, causing deterioration in coating adhesion or weldability. Thus, if present, the Cr content is 0.001% or more and 1.0% or less.

Mo: 0.05% to 1.0%

Less than 0.05% of Mo has little effect of strength adjustment. Less than 0.05% of Mo in combination with Nb, Ni, or Cu has little effect of improving coating adhesion. On the other hand, more than 1.0% results in an increase in cost. Thus, if present, the Mo content is 0.05% or more and 1.0% or less.

Cu: 0.05% to 1.0%

Less than 0.05% of Cu has little effect of promoting the formation of a residual γ phase. Less than 0.05% of Cu in combination with Ni or Mo has little effect of improving coating adhesion. On the other hand, more than 1.0% results in an increase in cost. Thus, if present, the Cu content is 0.05% or more and 1.0% or less.

Ni: 0.05% to 1.0%

Less than 0.05% of Ni has little effect of promoting the formation of a residual γ phase. Less than 0.05% of Ni in combination with Cu and Mo has little effect of improving coating adhesion. On the other hand, more than 1.0% results in an increase in cost. Thus, if present, the Ni content is 0.05% or more and 1.0% or less.

The remainder are Fe and incidental impurities.

The coating layer composition and the coating layer structure of a hot-dip Al—Zn coated steel sheet according to the present invention will be described below. The unit of each element content of the coating layer composition is "% by mass", which is simply expressed by "%" unless otherwise specified.

Al: 20% to 95%

A coated steel sheet according to an exemplary embodiment of the present invention is a hot-dip Al—Zn coated steel sheet that contains 20% to 95% of Al in the coating layer. 20% or more of Al results in the dendritic solidification of Al in an upper layer of the coating layer, which includes two layers: an alloy phase at an interface between the coating layer and the base steel sheet and the upper layer disposed on the alloy phase. Thus, the upper layer includes one portion that mainly contains supersaturated Zn and in which Al is dendritically solidified and another portion between the dendrites. The dendritic solidification portion has a layered structure in the thickness direction of the coating layer and has a structure having excellent corrosion resistance and processability. For this reason, the lower limit of Al is 20%. In order to consistently form such a coating layer structure, Al is preferably 45% or more. However, more than 95% of Al results in a decreased amount of Zn, which has a sacrificial protection effect on Fe, causing deterioration in corrosion resistance when the steel base material is exposed. Thus, the upper limit of Al is 95%. In general, a smaller amount of coating adhered results in a larger area of steel base material exposed. In order to achieve sufficient corrosion resistance even with a small amount of adhered coating, Al is preferably 85% or less. In Al—Zn hot-dip coating, an increase in Al content results in an increase in coating bath temperature (hereinafter referred to as bath temperature), possibly causing an operational problem. However, the Al content described above results in a moderate bath temperature and causes no problem. For this reason, the Al content of the coating layer is limited to the range of 20% to 95% and is preferably in the range of 45% to 85% in terms of the balance between performance (corrosion resistance, processability, or the like) and operation. More preferred range is 55% to 80%.

Zn: 10% or more

In the present invention, the Zn content of the coating layer is preferably 10% or more. A Zn content of 10% or more results in the formation of a dense corrosion product that contains Al and Zn in a joint and produces a sacrificial anode effect of Zn on exposed base iron in a portion subjected to advanced processing, providing excellent joint corrosion resistance and corrosion resistance after advanced processing. 50% or less results in stable formation of the dense corrosion product that contains Al and Zn in a joint and is therefore more preferred. More preferred range is 15% to 40%.

Ca: 0.01% to 10% or Ca+Mg: 0.01% to 10%

In the present invention, the coating layer preferably contains 0.01% to 10% of Ca. Alternatively, the coating layer contains 0.01% to 10% of Ca and Mg in total. The inclusion of Ca or Ca and Mg in the coating layer results in the inclusion of these elements in a corrosion product produced in the joint. This stabilizes the corrosion product. This also retards subsequent development of corrosion. Less than 0.01% of Ca or Ca and Mg in total cannot produce this effect. On the other hand, the effect is saturated at more than 10%. Furthermore, an increase in these contents results in an increase in cost and difficulty in the control of the bath composition. Thus, the Ca content or the Ca and Mg content of the coating layer is 0.01% or more and 10% or less. When the Ca content or the Ca and Mg content is more than 2.00% and 10% or less, a hard intermetallic compound that contains Ca or Mg described below is formed in the Zn phase. This is preferred because this increases the hardness of the coating layer and allows the manufacture of a coated steel sheet having high scratch resistance in which the surface of the coating layer is resistant to scratch. More preferably, Ca is 3.0% or more, and Ca+Mg is 4.0% or more.

Mass ratio of Ca to Zn (Ca/Zn): 0.5 or less In the present invention, the mass ratio of Ca to Zn (Ca/Zn) in the coating layer is preferably 0.5 or less. At 0.5 or less, while Ca has a function of stabilizing a corrosion product in the joint, the sacrificial anode effect of Zn can be sufficiently achieved, resulting in excellent joint corrosion resistance and corrosion resistance after advanced processing. At 0.25 or less, the largest sacrificial anode effect of Zn can be achieved. Thus, 0.25 or less is more preferred. Still more preferred range is 0.05 to 0.20.

The coating layer includes an upper layer and an alloy phase at an interface between the coating layer and the base steel sheet. The upper layer preferably contains Ca or Ca and Mg. When the coating layer includes the alloy phase at an interface between the coating layer and the base steel sheet and the upper layer disposed on the alloy phase and when Ca or Ca and Mg in the coating layer is mainly present in the upper layer, these elements can fully produce an effect of stabilizing a corrosion product. Ca and Mg are preferably present in the upper layer rather than the alloy phase at the interface because Ca and Mg in the upper layer can stabilize a corrosion product in an early stage of corrosion and retard subsequent development of corrosion.

The alloy phase and the upper layer in the present invention can be easily identified by the observation of a polished cross section of the coating layer with a scanning electron microscope. There are several methods for polishing or etching a cross section. Any method that is used in the observation of a cross section of a coating layer may be used.

The presence of Ca or Ca and Mg in the upper layer can be identified by the penetration analysis of the coating layer, for example, with a glow discharge optical emission spectrometer. Ca or Ca and Mg mainly present in the upper layer can be identified by examining the distribution of Ca or Ca and Mg in the coating film thickness direction, for example, by the penetration analysis of the coating layer with the glow discharge optical emission spectrometer. Use of the glow discharge optical emission spectrometer is only an example. Any method for determining the presence and distribution of Ca or Ca and Mg in the coating layer may be used.

The presence of Ca or Ca and Mg in the upper layer can be determined by the detection of 90% or more of all the detected peaks of Ca or Ca and Mg in the upper layer rather than the alloy phase at the interface, for example, by the penetration analysis of the coating layer with a glow discharge optical emission spectrometer. This determination method may be any method for detecting the distribution of elements in the depth direction in the coating layer and is not particularly limited.

In order to fully achieve the effect of stabilizing a corrosion product, when the coating layer is divided into equal parts in the thickness direction on the surface layer side and the base steel sheet side, Ca or Ca and Mg in the coating layer are preferably present in greater amount on the surface layer side than the base steel sheet side. Ca and Mg present in greater amount on the surface layer side can result in the presence of Ca and Mg in a corrosion product in an early stage of corrosion, thus further stabilizing the corrosion product.

Ca or Ca and Mg present in greater amount on the surface layer side can be identified by the detection of more than 50% of all the detected peaks of Ca or Ca and Mg on the surface layer side when the coating layer is divided into equal parts in the thickness direction on the surface layer side and the base steel sheet side, for example, by the penetration analysis of the coating layer with a glow discharge optical emission spectrometer. This determination method may be any method for detecting the distribution of elements in the depth direction in the coating layer and is not particularly limited.

Ca or Ca and Mg in the coating layer preferably form an intermetallic compound with one or two or more selected from Zn, Al, and Si. Since an Al phase is solidified earlier than a Zn phase in the formation of the coating layer, the intermetallic compound is incorporated into the Zn phase. Thus, Ca or Mg in the intermetallic compound always coexists with Zn. In a corrosive environment, this ensures the incorporation of Ca or Mg in a corrosion product formed of Zn, which is corroded earlier than Al, thus further effectively stabilizing the corrosion product in an early stage of corrosion. Examples of the intermetallic compound include one or two or more of $Al_4Ca$, $Al_2Ca$, $Al_2CaSi_2$, $Al_2CaSi_{1.5}$, $Ca_3Zn$, $CaZn_3$, $CaSi_2$, $CaZnSi$, $Al_3Mg_2$, $MgZn_2$, and $Mg_2Si$. These are suitable in terms of the stabilization of the corrosion product. In particular, the intermetallic compound more preferably contains Si because surplus Si in the coating layer forms non-solid-solution Si in the upper layer, which can prevent deterioration in bending workability (90° bending or 2T bending in advanced processing). In particular, $Al_2CaSi_2$ and/or $Al_2CaSi_{1.5}$, which is an intermetallic compound easiest to form at Al: 25% to 95% by mass, Ca: 0.01% to 10% by mass, and Si: approximately 3% by mass of Al, is most preferred, because surplus Si in the coating layer forms non-solid-solution Si in the upper layer, which can prevent deterioration in bending workability (90° bending or 2T bending in advanced processing), as described above.

A method for determining whether Ca or Ca and Mg form an intermetallic compound with one or two or more selected from Zn, Al, and Si may be a method for detecting the intermetallic compound by the wide-angle X-ray diffraction analysis of a surface of the coated steel sheet or a method for detecting the intermetallic compound by the electron diffraction analysis of a cross section of the coating layer in a transmission electron microscope. Any other method that can detect the intermetallic compound may be used.

Next, a method for manufacturing a hot-dip Al—Zn coated steel sheet according to the present invention will be described below. Steel is hot-rolled and then cold-rolled to form a steel sheet. The steel sheet is then subjected to annealing and hot-dip Al—Zn coating treatment in a heating step with continuous hot-dip coating equipment. In this case, in the present invention, preferably, a temperature region having an annealing furnace internal temperature in the heating step of 400° C. or more and 900° C. or less is controlled to have an atmosphere containing 0.01% by volume or more and 20% by volume or less of $O_2$, and then a temperature region having an annealing furnace internal temperature of 600° C. or more and 950° C. or less is controlled to have a $H_2$—$N_2$ gas atmosphere that has a dew point of −60° C. or more and 10° C. or less and that contains 3% by volume or more of $H_2$. Alternatively, a temperature region having an annealing furnace internal temperature of 650° C. or more is preferably controlled to have a $H_2$—$N_2$ gas atmosphere that has a dew point of −10° C. or more and 10° C. or less and that contains 3% by volume or more of $H_2$. In the coating bath, the Al content is in the range of 25% to 95% by mass, and the Ca content or the Ca and Mg content is in the range of 0.01% to 10% by mass.

Hot Rolling

General conditions may be used.

Pickling

The hot rolling is preferably followed by pickling treatment. Mill scale formed on the surface is removed in a pickling process before cold rolling. The pickling conditions are not particularly limited.

Cold Rolling

The rolling reduction is preferably 40% or more and 80% or less. A rolling reduction of less than 40% results in a decrease in recrystallization temperature and tends to cause deterioration in mechanical characteristics. On the other hand, a rolling reduction of more than 80% results in an increased rolling cost and also increased surface enrichment during annealing and may therefore cause deterioration in coatability.

Heating Step

The cold-rolled steel sheet is annealed in the heating step before hot-dip Al—Zn coating treatment.

In an annealing furnace in the heating step, a heating process for heating a steel sheet to a predetermined temperature in a heating zone is followed by a soaking process for maintaining the steel sheet in a soaking zone at a predetermined temperature for a predetermined time.

As described above, in the heating step, annealing is preferably performed while a temperature region having an annealing furnace internal temperature of 400° C. or more and 900° C. or less is controlled to have an atmosphere containing 0.01% by volume or more and 20% by volume or less of $O_2$, and a temperature region having an annealing furnace internal temperature of 600° C. or more and 950° C. or less is then controlled to have a $H_2$—$N_2$ gas atmosphere that has a dew point of −60° C. or more and 10° C. or less and that contains 3% by volume or more of $H_2$.

A temperature region having an annealing furnace internal temperature of 650° C. or more is preferably controlled to have a $H_2$—$N_2$ gas atmosphere that has a dew point of −10° C. or more and 10° C. or less and that contains 3% by volume or more of $H_2$.

Hot-dip Coating Treatment

A hot-dip Al—Zn coated steel sheet according to the present invention may be manufactured with continuous hot-dip coating equipment. In the coating bath, the Al content is in the range of 25% to 95% by mass, and the Ca content or the Ca and Mg content is in the range of 0.01% to 10% by mass. The mass ratio Ca/Zn of the Ca content to the Zn content of the coating bath is preferably 0.50 or less. The Zn content is preferably 10% by mass or more. The Al content is preferably in the range of 45% to 85% by mass. This is also one of the most important requirements in the present invention. The coating bath having such a composition can be used to manufacture the hot-dip Al—Zn coated steel sheet. In order to reduce the excessive growth of an alloy phase, Si in the coating bath generally corresponds to approximately 3% by mass of Al, suitably 1.5% to 10% by mass of Al. In addition to Al, Zn, Ca, Mg, and Si described above, the coating bath for a coated steel sheet according to the present invention may contain another element, such as Sr, V, Mn, Ni, Co, Cr, Ti, Sb, Ca, Mo, or B, without compromising the advantages of the present invention.

A method for manufacturing a hot-dip Al—Zn coated steel sheet that includes a coating layer, which includes an alloy phase at an interface between the coating layer and the base steel sheet and an upper layer disposed on the alloy phase, and in which Ca or Ca and Mg in the coating layer is mainly present in the upper layer may be any method provided that Ca or Ca and Mg can be mainly present in the upper layer. For example, the cooling rate after coating may be increased to reduce the formation of the alloy phase, thereby decreasing residual Ca or Ca and Mg in the alloy phase. In this case, the cooling rate after coating is preferably 10° C./s or more.

A method for manufacturing a hot-dip Al—Zn coated steel sheet in which Ca or Ca and Mg in the coating layer is present in greater amount on the surface layer side than the base steel sheet side when the coating layer is divided into equal parts in the thickness direction on the surface layer side and the base steel sheet side may be any method provided that Ca and Mg can be present in greater amount on the surface layer side than the base steel sheet side when the coating layer is divided into equal parts in the thickness direction on the surface layer side and the base steel sheet side. In an exemplary method, a solidification reaction of the coating layer proceeds from the base steel sheet side to the surface layer side to eject Ca or Ca and Mg toward the surface layer side with the progress of solidification. This can be achieved in a cooling step after coating in common continuous hot-dip coating operation.

The temperature of a steel sheet dipped in the coating bath (hereinafter referred to as dipped sheet temperature) is preferably controlled within ±20° C. of the coating bath temperature so as to prevent the change of the bath temperature in the continuous hot-dip coating operation.

Thus, a hot-dip Al—Zn coated steel sheet according to the present invention can be manufactured. A hot-dip Al—Zn coated steel sheet according to the present invention preferably includes a hot-dip Al—Zn coating layer, wherein the amount of coating adhered to the surface of the steel sheet is preferably 20 to 120 g/m² per surface. It is difficult to ensure corrosion resistance at less than 20 g/m². On the other hand, more than 120 g/m² causes deterioration in the peel resistance of coating.

The surface of the base steel sheet directly under the coating layer has the following structural characteristics.

0.06 to 1.0 g/m² per surface of an internal oxide of at least one selected from Fe, Si, Mn, Al, P, B, Nb, Ti, Cr, Mo, Cu, and Ni is formed on a surface of the steel sheet within 100 μm from the surface of the base steel sheet directly under the Al—Zn coating layer.

The hot-dip Al—Zn coated steel sheet may include a chemical conversion film and/or a coating film containing organic resin on the surface thereof to form a surface-treated steel sheet. The chemical conversion film may be formed by chromate treatment or chromium-free chemical conversion treatment in which a chromate treatment liquid or a chromium-free chemical conversion liquid is applied and dried at a steel sheet temperature in the range of 80° C. to 300° C. without water washing. The chemical conversion film may be a monolayer or multilayer. The multilayer may be formed by performing a plurality of chemical conversion treatments.

Furthermore, a monolayer or multilayer coating film that contains organic resin may be formed on the surface of the coating layer or the chemical conversion film. Examples of the coating film include polyester resin coating films, epoxy resin coating films, acrylic resin coating films, urethane resin coating films, and fluoropolymer coating films. Some of these resins modified with another resin, for example, epoxy-modified polyester resin coating films may be used. If necessary, a curing agent, a curing catalyst, a pigment, and/or an additive agent may be added to these resins.

A coating method for forming the coating film may be, but is not limited to, roll coater coating, curtain flow coating, or spray coating. A paint that contains organic resin may be applied and heat-dried, for example, by hot-air drying, infrared heating, or induction heating, to form the coating film.

The method for manufacturing a surface-treated steel sheet described above is a nonlimiting example.

EXAMPLES

The present invention will be further described in the following examples.

A hot-rolled steel sheet having a steel composition shown in Table 1 was pickled and, after removing mill scale, was cold-rolled at a rolling reduction of 50% to form a cold-rolled steel sheet having a thickness of 1.0 mm.

The cold-rolled steel sheet was then passed through continuous hot-dip coating equipment to manufacture a hot-dip Al—Zn coated steel sheet. Table 2 shows the composition of a coating bath (the Al, Zn, Si, Ca, or Mg content and the Ca and Mg content of the coating bath are the same as the coating layer). Tables 3 and 4 show the manufacturing conditions for the continuous hot-dip coating equipment. NO. 1 to 56 involves a pre-oxidation process before reduction annealing in the heating step. Nos. 57 to 67 involves reduction annealing in an atmosphere having a high dew point.

The line speed was 100 m/min. The amount of coating was controlled by gas wiping. The dipped sheet temperature in the coating bath was controlled between the coating bath temperature and the coating bath temperature +5° C. The cooling rate after coating was 15° C./s.

The hot-dip Al—Zn coated steel sheet was examined with respect to coating appearance (the presence of an uncoated portion), joint corrosion resistance, corrosion resistance after advanced processing, and mechanical characteristics. The amount of oxide (the amount of internal oxidation) within 100 μm from the surface of the surface layer of the base steel sheet directly under the coating layer and the percentage of Ca and Mg in the upper layer of the coating layer were measured. The measurement method and the evaluation criteria are described below.

Coating Appearance

The coating appearance was visually inspected. The absence of an uncoated portion (a portion not covered with coating) was considered to be satisfactory appearance (symbol O), and the presence of an uncoated portion (a portion not covered with coating) was considered to be defective appearance (symbol X).

When the coating appearance was considered to be defective appearance (symbol X), joint corrosion resistance, mechanical characteristics, and the percentage of Ca and Mg in the upper layer were not evaluated.

Joint Corrosion Resistance

Regarding joint corrosion resistance, as illustrated in FIG. 1, a coated surface of a galvannealed steel sheet (large sheet) having a coating amount of 45 g/m² per surface and a surface of the hot-dip Al—Zn coated steel sheet (small sheet: a steel sheet to be tested) on which the coating layer was formed were joined by spot welding to form a laminated sheet. The laminated sheet was then subjected to chemical conversion treatment (zinc phosphate 2.0 to 3.0 g/m²) and electrodeposition coating (film thickness 20±1 μm) and was subjected to a corrosion resistance test cycle illustrated in FIG. 2. The corrosion resistance test was started with wetting. After 150 cycles, the joint corrosion resistance was evaluated as described below.

A joint of the test specimen subjected to the corrosion resistance test was disjointed to remove the coating film and rust. The corrosion depth of the base steel sheet was measured with a micrometer. A corroded portion of the test specimen was divided into 10 sections each having a size of 20 mm×15 mm. The maximum corrosion depth of each section was determined as a difference between the layer thickness of an uncorroded portion and the layer thickness of the corroded portion. The extreme value statistics analysis was performed by applying Gumbel distribution to the maximum corrosion depth data of each section to determine the most frequent value of the maximum corrosion depth.

Corrosion Resistance after Advanced Processing

Figure 2:
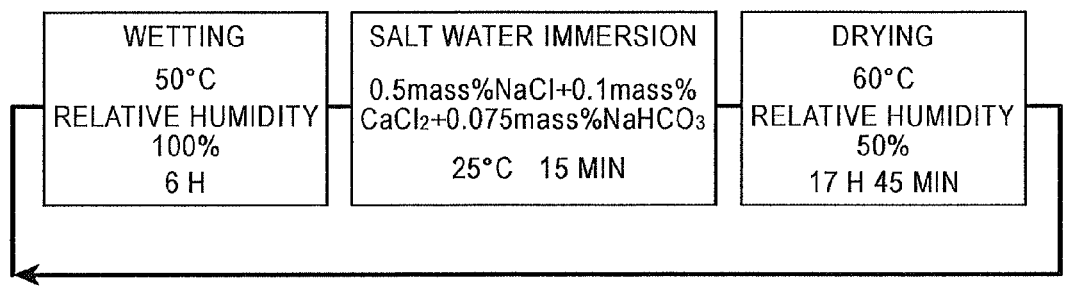
FIG. 2 is a block diagram of a corrosion resistance test cycle. (Example 1)

Regarding corrosion resistance after advanced processing, three test specimens (100 mm×100 mm) of each of the hot-dip Al—Zn coated steel sheets were subjected to 90° bending and 2T bending. Without chemical conversion treatment or coating treatment, only a sheared end face of each test specimen was protected by sealing. A corrosion resistance test cycle was then performed as illustrated in FIG. 2. The corrosion resistance test was started with wetting. After 30 cycles, the corrosion resistance after advanced processing was evaluated as described below.

90° bending was performed by a press bending method in accordance with JIS Z 2248 1996 such that a surface to be examined faces outward. 2T bending was performed by a winding method in accordance with JIS Z 2248 1996 such that a surface to be examined faces outward while two steel sheets each having the same thickness as the test specimen were inserted.

The appearance of the outside of the bended portion of the coated steel sheet after the corrosion resistance test was visually inspected. The absence of red rust was considered to be satisfactory (symbol O), and the presence of red rust was considered to be defective (symbol X).

When both the corrosion resistance of 90° bending and the corrosion resistance after 2T bending were satisfactory (symbol O), the corrosion resistance after advanced processing was considered to be excellent (symbol ⊚: double circle). When either the corrosion resistance of 90° bending or the corrosion resistance after 2T bending was satisfactory (symbol O), the corrosion resistance after advanced processing was considered to be good (symbol O). When both the corrosion resistance of 90° bending and the corrosion resistance after 2T bending were defective (symbol X), the corrosion resistance after advanced processing was considered to be poor (symbol X).

Mechanical Characteristics

Regarding mechanical characteristics, a JIS No. 5 test piece for tensile test was taken from a sample in a direction perpendicular to the rolling direction. A tensile test was performed in accordance with JIS Z 2241 1998 at a crosshead speed of 10 mm/min to determine tensile strength (TS (MPa)) and elongation (El (%)). Test pieces having TS×El≥18000 have particularly excellent mechanical characteristics.

The amount of internal oxidation within 100 μm from the surface directly under the coating layer was measured by an "impulse furnace fusion-infrared absorption method". As described above, the oxygen content $O_I$ of the entire steel sheet and the oxygen content $O_H$ of the material were used to calculate a difference between $O_I$ and $O_H$ ($=O_I-O_H$). The difference was converted into a value per surface unit area (that is, 1 m²) (g/m²), which was assumed to be the amount of internal oxidation.

Regarding the percentage of Ca and Mg in the upper layer of the coating layer, 4 mmϕ on a surface of the coating layer was subjected to the penetration analysis in the thickness direction of the coating layer with a glow discharge optical emission spectrometer to examine the distribution of Ca or Ca and Mg in the thickness direction of the coating layer. More specifically, the number of seconds (sputtering time) elapsed before the waveform of the detected intensity of Ca and Mg converged to the detected value of the base steel sheet was considered to be the coating layer thickness. The number of seconds (sputtering time) elapsed before the detected intensity waveform of Ca and Mg had an inflection point was considered to be the upper layer thickness. When the coating layer contained Ca, the percentage of Ca in the upper layer based on Ca and Mg in the entire coating layer (the ratio of integrated values of detected intensities) was determined. When the coating layer contained Ca and Mg, the percentage of Ca and Mg in the upper layer based on Ca and Mg in the entire coating layer (the ratio of integrated values of detected intensities) was determined.

Tables 3 and 4 show various characteristics of the Al—Zn coated steel sheet thus manufactured and the manufacturing conditions.

TABLE 1

| Steel | C | Si | Mn | Al | P | S | Cr | Mo | B | Nb | Cu | Ni | Ti (mass %) |
|---|---|---|---|---|---|---|---|---|---|---|---|---|---|
| A | 0.02 | 0.005 | 2.0 | 0.03 | 0.01 | 0.004 | — | — | — | — | — | — | — |
| B | 0.05 | 0.03 | 1.2 | 0.03 | 0.01 | 0.004 | — | — | — | — | — | — | — |
| C | 0.15 | 0.1 | 2.1 | 0.03 | 0.01 | 0.004 | — | — | — | — | — | — | — |
| D | 0.05 | 0.25 | 2.0 | 0.03 | 0.01 | 0.004 | — | — | — | — | — | — | — |
| E | 0.02 | 0.4 | 2.0 | 0.03 | 0.01 | 0.004 | — | — | — | — | — | — | — |
| F | 0.12 | 0.8 | 1.9 | 0.03 | 0.01 | 0.004 | — | — | — | — | — | — | — |
| G | 0.17 | 1.2 | 2.1 | 0.03 | 0.01 | 0.004 | — | — | — | — | — | — | — |
| H | 0.10 | 1.6 | 2.0 | 0.03 | 0.01 | 0.004 | — | — | — | — | — | — | — |
| I | 0.05 | 2.0 | 2.1 | 0.03 | 0.01 | 0.004 | — | — | — | — | — | — | — |
| J | 0.12 | 0.8 | 2.9 | 0.03 | 0.01 | 0.004 | — | — | — | — | — | — | — |
| K | 0.12 | 0.8 | 2.0 | 0.9 | 0.01 | 0.004 | — | — | — | — | — | — | — |
| L | 0.12 | 0.8 | 2.1 | 0.03 | 0.05 | 0.004 | — | — | — | — | — | — | — |
| M | 0.12 | 0.8 | 1.9 | 0.03 | 0.01 | 0.009 | — | — | — | — | — | — | — |
| N | 0.12 | 0.8 | 1.9 | 0.02 | 0.01 | 0.004 | 0.8 | — | — | — | — | — | — |
| O | 0.12 | 0.8 | 1.9 | 0.03 | 0.01 | 0.004 | — | 0.1 | — | — | — | — | — |
| P | 0.12 | 0.8 | 2.2 | 0.03 | 0.01 | 0.004 | — | — | 0.003 | — | — | — | — |
| Q | 0.12 | 0.8 | 2.0 | 0.05 | 0.01 | 0.004 | — | — | 0.001 | 0.03 | — | — | — |
| R | 0.12 | 0.8 | 1.9 | 0.03 | 0.01 | 0.004 | — | 0.1 | — | — | 0.1 | 0.2 | — |
| S | 0.12 | 0.8 | 1.9 | 0.04 | 0.01 | 0.004 | — | — | 0.001 | — | — | — | 0.02 |
| T | 0.12 | 0.8 | 1.9 | 0.03 | 0.01 | 0.004 | — | — | — | — | — | — | 0.05 |

TABLE 2

| Coating bath | Coating bath composition (mass %) | | | | | | Coating bath Ca/Zn | Bath temperature (° C.) | Note |
|---|---|---|---|---|---|---|---|---|---|
| | Al | Zn | Si | Ca | Mg | Ca + Mg | | | |
| a | 90 | 5 | 2.9 | 1.27 | 1.05 | 2.32 | 0.27 | 670 | Example |
| b | 90 | 5 | 2.9 | 2.13 | 0.00 | 2.13 | 0.43 | 670 | Example |
| c | 82 | 11 | 2.5 | 2.23 | 2.09 | 4.32 | 0.20 | 650 | Example |
| d | 82 | 14 | 2.5 | 1.89 | 0.00 | 1.89 | 0.14 | 650 | Example |
| e | 71 | 22 | 2.2 | 2.54 | 2.27 | 4.81 | 0.12 | 620 | Example |
| f | 71 | 24 | 2.2 | 2.92 | 0.00 | 2.92 | 0.12 | 620 | Example |
| g | 55 | 37 | 1.6 | 3.26 | 3.03 | 6.29 | 0.09 | 570 | Example |
| h | 55 | 40 | 1.6 | 3.56 | 0.00 | 3.56 | 0.09 | 570 | Example |
| I | 48 | 43 | 1.5 | 4.25 | 3.61 | 7.86 | 0.10 | 560 | Example |
| j | 48 | 45 | 1.5 | 5.69 | 0.00 | 5.69 | 0.13 | 560 | Example |
| k | 42 | 49 | 1.3 | 4.16 | 3.48 | 7.64 | 0.08 | 540 | Example |
| l | 42 | 52 | 1.3 | 4.56 | 0.00 | 4.56 | 0.09 | 540 | Example |
| m | 27 | 64 | 0.7 | 4.36 | 3.68 | 8.04 | 0.07 | 520 | Example |
| n | 27 | 66 | 0.7 | 5.85 | 0.00 | 5.85 | 0.09 | 520 | Example |
| o | 55 | 43 | 1.6 | <u>0.00</u> | 0.00 | <u>0.00</u> | 0.00 | 600 | Comparative example |

Underline indicates outside the scope of the present invention

TABLE 3

| | | Steel | | Cold-rolling reduction (%) | Heating zone | | | | | | | | |
|---|---|---|---|---|---|---|---|---|---|---|---|---|---|
| | | | | | Pre-oxidation | | | | | | Reduction annealing | | |
| No. | Symbol | Si (%) | Mn (%) | | $O_2$ (%) | $H_2O$ (%) | $N_2$ (%) | $CO_2$ (%) | Others | Furnace internal temperature (° C.) | $H_2$ (%) | Dew point (° C.) | Furnace internal temperature (° C.) |
| 1 | A | 0.005 | 2.1 | 50 | 0.5 | 15 | 76 | 7 | CO, $H_2$ | 500 | 5 | −35 | 860 |
| 2 | B | 0.03 | 1.2 | 50 | 0.5 | 15 | 76 | 7 | CO, $H_2$ | 400 | 5 | −35 | 860 |
| 3 | C | 0.1 | 2.1 | 50 | 0.5 | 15 | 76 | 7 | CO, $H_2$ | 600 | 5 | −35 | 860 |

TABLE 3-continued

| No. | Steel | C1 | C2 | C3 | C4 | C5 | C6 | C7 | Atmosphere | Temp | C10 | Dew pt | C12 | H2 (%) | Dew point (°C) | Soaking time (s) | Soaking temperature (°C) | Amount of internal oxidation (g/m²) | Cooling speed (°C/sec) | H2 (%) | Composition (symbol) | Amount of coating (g/m²) | Coating appearance |
|---|---|---|---|---|---|---|---|---|---|---|---|---|---|---|---|---|---|---|---|---|---|---|---|
| 4 | D | 0.25 | 2.0 | 50 | 0.5 | 15 | 76 | 7 | CO, H₂ | 650 | 5 | −35 | 860 | | | | | | | | | | |
| 5 | E | 0.4 | 2.0 | 50 | 0.5 | 15 | 76 | 7 | CO, H₂ | 650 | 5 | −35 | 860 | | | | | | | | | | |
| 6 | F | 0.8 | 1.9 | 50 | 0.5 | 15 | 76 | 7 | CO, H₂ | 650 | 5 | −35 | 860 | | | | | | | | | | |
| 7 | F | 0.8 | 1.9 | 50 | 0.5 | 15 | 76 | 7 | CO, H₂ | 650 | 5 | −35 | 860 | | | | | | | | | | |
| 8 | F | 0.8 | 1.9 | 50 | 0.5 | 15 | 76 | 7 | CO, H₂ | 650 | 5 | −35 | 860 | | | | | | | | | | |
| 9 | F | 0.8 | 1.9 | 50 | 0.5 | 15 | 76 | 7 | CO, H₂ | 650 | 5 | −35 | 860 | | | | | | | | | | |
| 10 | F | 0.8 | 1.9 | 50 | 0.5 | 15 | 76 | 7 | CO, H₂ | 350 | 5 | −35 | 580 | | | | | | | | | | |
| 11 | F | 0.8 | 1.9 | 50 | 0.5 | 15 | 76 | 7 | CO, H₂ | 650 | 5 | −35 | 600 | | | | | | | | | | |
| 12 | F | 0.8 | 1.9 | 50 | 0.5 | 15 | 76 | 7 | CO, H₂ | 650 | 5 | −35 | 650 | | | | | | | | | | |
| 13 | F | 0.8 | 1.9 | 50 | 0.5 | 15 | 76 | 7 | CO, H₂ | 650 | 5 | −35 | 750 | | | | | | | | | | |
| 14 | F | 0.8 | 1.9 | 50 | 0.5 | 15 | 76 | 7 | CO, H₂ | 650 | 5 | −35 | 800 | | | | | | | | | | |
| 15 | F | 0.8 | 1.9 | 50 | 0.5 | 15 | 76 | 7 | CO, H₂ | 650 | 5 | −35 | 900 | | | | | | | | | | |
| 16 | F | 0.8 | 1.9 | 50 | 0.5 | 15 | 76 | 7 | CO, H₂ | 650 | 5 | −35 | 950 | | | | | | | | | | |
| 17 | F | 0.8 | 1.9 | 50 | 0.5 | 15 | 76 | 7 | CO, H₂ | 380 | 5 | −35 | 860 | | | | | | | | | | |
| 18 | F | 0.8 | 1.9 | 50 | 0.5 | 15 | 76 | 7 | CO, H₂ | 920 | 10 | −35 | 860 | | | | | | | | | | |
| 19 | F | 0.8 | 1.9 | 50 | 0.01 | 15 | 63 | 20 | CO, H₂ | 900 | 5 | −35 | 860 | | | | | | | | | | |
| 20 | F | 0.8 | 1.9 | 50 | 5 | 15 | 75 | 3 | CO, H₂ | 800 | 5 | −35 | 860 | | | | | | | | | | |
| 21 | F | 0.8 | 1.9 | 50 | 8 | 15 | 68 | 7 | CO, H₂ | 750 | 5 | −35 | 860 | | | | | | | | | | |
| 22 | F | 0.8 | 1.9 | 50 | 10 | 15 | 66 | 7 | CO, H₂ | 750 | 5 | −35 | 860 | | | | | | | | | | |
| 23 | F | 0.8 | 1.9 | 50 | 15 | 15 | 62 | 7 | CO, H₂ | 700 | 5 | −35 | 860 | | | | | | | | | | |
| 24 | F | 0.8 | 1.9 | 50 | 20 | 15 | 58 | 6 | CO, H₂ | 650 | 5 | −35 | 860 | | | | | | | | | | |
| 25 | F | 0.8 | 1.9 | 50 | 0.5 | 15 | 76 | 7 | CO, H₂ | 650 | 5 | −50 | 860 | | | | | | | | | | |
| 26 | F | 0.8 | 1.9 | 50 | 0.5 | 15 | 76 | 7 | CO, H₂ | 650 | 10 | −10 | 860 | | | | | | | | | | |
| 27 | F | 0.8 | 1.9 | 50 | 0.5 | 15 | 76 | 7 | CO, H₂ | 650 | 25 | −20 | 860 | | | | | | | | | | |
| 28 | F | 0.8 | 1.9 | 50 | 0.5 | 15 | 76 | 7 | CO, H₂ | 650 | 15 | 10 | 860 | | | | | | | | | | |
| 29 | F | 0.8 | 1.9 | 50 | 0.5 | 15 | 76 | 7 | CO, H₂ | 650 | 5 | −35 | 860 | | | | | | | | | | |
| 30 | F | 0.8 | 1.9 | 50 | 0.5 | 15 | 76 | 7 | CO, H₂ | 650 | 5 | −35 | 860 | | | | | | | | | | |
| 31 | F | 0.8 | 1.9 | 50 | 0.5 | 15 | 76 | 7 | CO, H₂ | 650 | 5 | −35 | 860 | | | | | | | | | | |
| 32 | F | 0.8 | 1.9 | 50 | 0.5 | 15 | 76 | 7 | CO, H₂ | 650 | 5 | −35 | 860 | | | | | | | | | | |
| 33 | F | 0.8 | 1.9 | 50 | 0.5 | 15 | 76 | 7 | CO, H₂ | 650 | 5 | −35 | 860 | | | | | | | | | | |
| 34 | F | 0.8 | 1.9 | 50 | 0.5 | 15 | 76 | 7 | CO, H₂ | 650 | 5 | −35 | 860 | | | | | | | | | | |
| 35 | F | 0.8 | 1.9 | 50 | 0.5 | 15 | 76 | 7 | CO, H₂ | 650 | 5 | −35 | 860 | | | | | | | | | | |
| 36 | F | 0.8 | 1.9 | 50 | 0.5 | 15 | 76 | 7 | CO, H₂ | 650 | 5 | −35 | 860 | | | | | | | | | | |
| 37 | F | 0.8 | 1.9 | 50 | 0.5 | 15 | 76 | 7 | CO, H₂ | 650 | 5 | −35 | 860 | | | | | | | | | | |
| 38 | F | 0.8 | 1.9 | 50 | 0.5 | 15 | 76 | 7 | CO, H₂ | 650 | 5 | −35 | 860 | | | | | | | | | | |
| 39 | F | 0.8 | 1.9 | 50 | 0.5 | 15 | 76 | 7 | CO, H₂ | 650 | 5 | −35 | 860 | | | | | | | | | | |
| 40 | F | 0.8 | 1.9 | 50 | 0.5 | 15 | 76 | 7 | CO, H₂ | 650 | 5 | −35 | 860 | | | | | | | | | | |
| 41 | F | 0.8 | 1.9 | 50 | 0.5 | 15 | 76 | 7 | CO, H₂ | 650 | 5 | −35 | 860 | | | | | | | | | | |
| 42 | F | 0.8 | 1.9 | 50 | 0.5 | 15 | 76 | 7 | CO, H₂ | 650 | 5 | −35 | 860 | | | | | | | | | | |
| 43 | G | 1.2 | 2.1 | 50 | 0.5 | 15 | 76 | 7 | CO, H₂ | 650 | 5 | −35 | 860 | | | | | | | | | | |
| 44 | H | 1.6 | 2.0 | 50 | 5 | 15 | 75 | 3 | CO, H₂ | 800 | 5 | −35 | 860 | | | | | | | | | | |
| 45 | I | 2.0 | 2.1 | 50 | 5 | 15 | 75 | 3 | CO, H₂ | 880 | 5 | −35 | 860 | | | | | | | | | | |
| 46 | J | 0.8 | 2.9 | 50 | 0.5 | 15 | 76 | 7 | CO, H₂ | 750 | 5 | −35 | 860 | | | | | | | | | | |
| 47 | K | 0.8 | 2.0 | 50 | 0.5 | 15 | 76 | 7 | CO, H₂ | 800 | 5 | −35 | 860 | | | | | | | | | | |
| 48 | L | 0.8 | 2.1 | 50 | 0.5 | 15 | 76 | 7 | CO, H₂ | 650 | 5 | −35 | 860 | | | | | | | | | | |
| 49 | M | 0.8 | 1.9 | 50 | 0.5 | 15 | 76 | 7 | CO, H₂ | 650 | 5 | −35 | 860 | | | | | | | | | | |
| 50 | N | 0.8 | 1.9 | 50 | 0.5 | 15 | 76 | 7 | CO, H₂ | 800 | 5 | −35 | 860 | | | | | | | | | | |
| 51 | O | 0.8 | 1.9 | 50 | 0.5 | 15 | 76 | 7 | CO, H₂ | 650 | 5 | −35 | 860 | | | | | | | | | | |
| 52 | P | 0.8 | 2.2 | 50 | 0.5 | 15 | 76 | 7 | CO, H₂ | 650 | 5 | −35 | 860 | | | | | | | | | | |
| 53 | Q | 0.8 | 2.0 | 50 | 0.5 | 15 | 76 | 7 | CO, H₂ | 650 | 5 | −35 | 860 | | | | | | | | | | |
| 54 | R | 0.8 | 1.9 | 50 | 0.5 | 15 | 76 | 7 | CO, H₂ | 650 | 5 | −35 | 860 | | | | | | | | | | |
| 55 | S | 0.8 | 1.9 | 50 | 0.5 | 15 | 76 | 7 | CO, H₂ | 650 | 5 | −35 | 860 | | | | | | | | | | |
| 56 | T | 0.8 | 1.9 | 50 | 0.5 | 15 | 76 | 7 | CO, H₂ | 650 | 5 | −35 | 860 | | | | | | | | | | |
| 1 | | | | | | | | | | | | | | 5 | −35 | 20 | 860 | 0.10 | 15 | 5 | d | 40 | ○ |
| 2 | | | | | | | | | | | | | | 5 | −35 | 20 | 860 | 0.07 | 15 | 5 | d | 40 | ○ |
| 3 | | | | | | | | | | | | | | 5 | −35 | 20 | 860 | 0.09 | 15 | 5 | d | 40 | ○ |
| 4 | | | | | | | | | | | | | | 5 | −35 | 20 | 860 | 0.10 | 15 | 5 | d | 40 | ○ |
| 5 | | | | | | | | | | | | | | 5 | −35 | 20 | 860 | 0.12 | 15 | 5 | d | 40 | ○ |
| 6 | | | | | | | | | | | | | | 5 | −35 | 20 | 860 | 0.13 | 15 | 5 | d | 40 | ○ |
| 7 | | | | | | | | | | | | | | 5 | −35 | 20 | 860 | 0.13 | 15 | 5 | d | 20 | ○ |
| 8 | | | | | | | | | | | | | | 5 | −35 | 20 | 860 | 0.13 | 15 | 5 | d | 80 | ○ |
| 9 | | | | | | | | | | | | | | 5 | −35 | 20 | 860 | 0.13 | 15 | 5 | d | 120 | ○ |
| 10 | | | | | | | | | | | | | | 5 | −35 | 20 | 580 | 0.00 | 15 | 5 | d | 40 | X |
| 11 | | | | | | | | | | | | | | 5 | −35 | 20 | 600 | 0.11 | 15 | 5 | d | 40 | ○ |
| 12 | | | | | | | | | | | | | | 5 | −35 | 20 | 650 | 0.12 | 15 | 5 | d | 40 | ○ |
| 13 | | | | | | | | | | | | | | 5 | −35 | 20 | 750 | 0.12 | 15 | 5 | d | 40 | ○ |
| 14 | | | | | | | | | | | | | | 5 | −35 | 20 | 800 | 0.13 | 15 | 5 | d | 40 | ○ |
| 15 | | | | | | | | | | | | | | 5 | −35 | 20 | 900 | 0.23 | 20 | 5 | d | 40 | ○ |
| 16 | | | | | | | | | | | | | | 5 | −35 | 20 | 950 | 0.30 | 25 | 5 | d | 40 | ○ |
| 17 | | | | | | | | | | | | | | 5 | −35 | 20 | 860 | 0.03 | 15 | 5 | d | 40 | X |
| 18 | | | | | | | | | | | | | | 10 | −35 | 20 | 860 | 1.10 | 15 | 10 | d | 40 | X |
| 19 | | | | | | | | | | | | | | 5 | −35 | 20 | 860 | 0.19 | 15 | 5 | d | 40 | ○ |

TABLE 3-continued

| | | | | | | | | | | |
|---|---|---|---|---|---|---|---|---|---|---|
| 20 | 5 | −35 | 20 | 860 | 0.23 | 15 | 5 | d | 40 | ○ |
| 21 | 5 | −35 | 20 | 860 | 0.27 | 15 | 5 | d | 40 | ○ |
| 22 | 5 | −35 | 20 | 860 | 0.38 | 15 | 5 | d | 40 | ○ |
| 23 | 5 | −35 | 20 | 860 | 0.60 | 15 | 5 | d | 40 | ○ |
| 24 | 5 | −35 | 20 | 860 | 0.70 | 15 | 5 | d | 40 | ○ |
| 25 | 5 | −50 | 20 | 860 | 0.09 | 15 | 5 | d | 40 | ○ |
| 26 | 10 | −10 | 10 | 860 | 0.17 | 15 | 10 | d | 40 | ○ |
| 27 | 25 | −20 | 5 | 860 | 0.14 | 15 | 25 | d | 40 | ○ |
| 28 | 15 | 10 | 5 | 860 | 0.27 | 15 | 15 | d | 40 | ○ |
| 29 | 5 | −35 | 20 | 860 | 0.13 | 15 | 5 | a | 40 | ○ |
| 30 | 5 | −35 | 20 | 860 | 0.13 | 15 | 5 | b | 40 | ○ |
| 31 | 5 | −35 | 20 | 860 | 0.13 | 15 | 5 | c | 40 | ○ |
| 32 | 5 | −35 | 20 | 860 | 0.13 | 15 | 5 | e | 40 | ○ |
| 33 | 5 | −35 | 20 | 860 | 0.13 | 15 | 5 | f | 40 | ○ |
| 34 | 5 | −35 | 20 | 860 | 0.13 | 15 | 5 | g | 40 | ○ |
| 35 | 5 | −35 | 20 | 860 | 0.13 | 15 | 5 | h | 40 | ○ |
| 36 | 5 | −35 | 20 | 860 | 0.13 | 15 | 5 | I | 40 | ○ |
| 37 | 5 | −35 | 20 | 860 | 0.13 | 15 | 5 | j | 40 | ○ |
| 38 | 5 | −35 | 20 | 860 | 0.13 | 15 | 5 | k | 40 | ○ |
| 39 | 5 | −35 | 20 | 860 | 0.13 | 15 | 5 | l | 40 | ○ |
| 40 | 5 | −35 | 20 | 860 | 0.13 | 15 | 5 | m | 40 | ○ |
| 41 | 5 | −35 | 20 | 860 | 0.13 | 15 | 5 | n | 40 | ○ |
| 42 | 5 | −35 | 20 | 860 | 0.13 | 15 | 5 | o | 40 | ○ |
| 43 | 5 | −35 | 20 | 860 | 0.10 | 15 | 5 | f | 40 | ○ |
| 44 | 5 | −35 | 20 | 860 | 0.74 | 15 | 5 | f | 40 | ○ |
| 45 | 5 | −35 | 20 | 860 | 0.57 | 15 | 5 | f | 40 | ○ |
| 46 | 5 | −35 | 20 | 860 | 0.36 | 15 | 5 | f | 40 | ○ |
| 47 | 5 | −35 | 20 | 860 | 0.80 | 15 | 5 | f | 40 | ○ |
| 48 | 5 | −35 | 20 | 860 | 0.15 | 15 | 5 | f | 40 | ○ |
| 49 | 5 | −35 | 20 | 860 | 0.12 | 15 | 5 | f | 40 | ○ |
| 50 | 5 | −35 | 20 | 860 | 0.21 | 15 | 5 | f | 40 | ○ |
| 51 | 5 | −35 | 20 | 860 | 0.13 | 15 | 5 | f | 40 | ○ |
| 52 | 5 | −35 | 20 | 860 | 0.17 | 15 | 5 | f | 40 | ○ |
| 53 | 5 | −35 | 20 | 860 | 0.14 | 15 | 5 | f | 40 | ○ |
| 54 | 5 | −35 | 20 | 860 | 0.12 | 15 | 5 | f | 40 | ○ |
| 55 | 5 | −35 | 20 | 860 | 0.11 | 15 | 5 | f | 40 | ○ |
| 56 | 5 | −35 | 20 | 860 | 0.12 | 15 | 5 | f | 40 | ○ |

| No. | Ca/Mg ratio in coating upper layer (%) | Most frequent value of maximum corrosion depth after joint corrosion resistance test (mm) | Corrosion resistance after advanced processing 90° C. bending | 2T bending | Corrosion resistance after advanced processing | TS (MPa) | El (%) | TS × EL | Note |
|---|---|---|---|---|---|---|---|---|---|
| 1 | 94 | 0.21 | ○ | ○ | ○ | 667 | 35.4 | 23612 | Example |
| 2 | 93 | 0.22 | ○ | ○ | ○ | 656 | 36.1 | 23682 | Example |
| 3 | 94 | 0.18 | ○ | ○ | ○ | 796 | 29.4 | 23402 | Example |
| 4 | 95 | 0.22 | ○ | ○ | ○ | 661 | 43.5 | 28754 | Example |
| 5 | 94 | 0.19 | ○ | ○ | ○ | 1004 | 20.9 | 20984 | Example |
| 6 | 94 | 0.20 | ○ | ○ | ○ | 1021 | 18.3 | 18684 | Example |
| 7 | 94 | 0.24 | ○ | ○ | ○ | 1025 | 18.8 | 19270 | Example |
| 8 | 95 | 0.21 | ○ | ○ | ○ | 1022 | 20.1 | 20542 | Example |
| 9 | 94 | 0.20 | ○ | ○ | ○ | 1023 | 19.3 | 19744 | Example |
| 10 | — | — | X | X | X | — | — | — | Comparative example |
| 11 | 94 | 0.21 | ○ | ○ | ○ | 711 | 12.4 | 8816 | Example |
| 12 | 95 | 0.23 | ○ | ○ | ○ | 728 | 13.8 | 10046 | Example |
| 13 | 96 | 0.18 | ○ | ○ | ○ | 826 | 15.5 | 12803 | Example |
| 14 | 92 | 0.22 | ○ | ○ | ○ | 998 | 16.5 | 16467 | Example |
| 15 | 94 | 0.16 | ○ | ○ | ○ | 1032 | 19.4 | 20021 | Example |
| 16 | 93 | 0.20 | ○ | ○ | ○ | 1025 | 18.2 | 18655 | Example |
| 17 | — | — | X | X | X | — | — | — | Comparative example |
| 18 | — | — | X | X | X | — | — | — | Comparative example |
| 19 | 94 | 0.23 | ○ | ○ | ◎ | 1025 | 18.6 | 19065 | Example |
| 20 | 95 | 0.19 | ○ | ○ | ◎ | 1018 | 19.7 | 20055 | Example |
| 21 | 94 | 0.16 | ○ | ○ | ◎ | 1025 | 18.4 | 18860 | Example |
| 22 | 96 | 0.20 | ○ | ○ | ◎ | 1035 | 19.2 | 19872 | Example |
| 23 | 93 | 0.20 | ○ | ○ | ◎ | 1029 | 19.1 | 19654 | Example |
| 24 | 94 | 0.18 | ○ | ○ | ◎ | 1018 | 16.7 | 17001 | Example |
| 25 | 97 | 0.17 | ○ | ○ | ◎ | 1028 | 18.2 | 18710 | Example |
| 26 | 94 | 0.18 | ○ | ○ | ◎ | 1036 | 19.8 | 20513 | Example |
| 27 | 95 | 0.22 | ○ | ○ | ◎ | 1024 | 20.1 | 20582 | Example |
| 28 | 94 | 0.20 | ○ | ○ | ◎ | 1022 | 19.8 | 20236 | Example |
| 29 | 96 | 0.32 | ○ | X | ○ | 1066 | 17.1 | 18229 | Example |
| 30 | 98 | 0.40 | ○ | X | ○ | 1028 | 18.1 | 18607 | Example |

TABLE 3-continued

| | | | | | | | | | | |
|---|---|---|---|---|---|---|---|---|---|---|
| 31 | 98 | 0.07 | ○ | ○ | ◎ | 1025 | 18.4 | 18860 | Example |
| 32 | 97 | 0.06 | ○ | ○ | ◎ | 1038 | 20.3 | 21071 | Example |
| 33 | 98 | 0.23 | ○ | ○ | ◎ | 1021 | 19.4 | 19807 | Example |
| 34 | 97 | 0.08 | ○ | ○ | ◎ | 1019 | 19.9 | 20278 | Example |
| 35 | 96 | 0.28 | ○ | ○ | ◎ | 1034 | 18.9 | 19543 | Example |
| 36 | 94 | 0.17 | ○ | ○ | ◎ | 1029 | 19.4 | 19963 | Example |
| 37 | 95 | 0.32 | ○ | ○ | ◎ | 1021 | 18.6 | 18991 | Example |
| 38 | 95 | 0.35 | ○ | X | ○ | 1033 | 19.1 | 19730 | Example |
| 39 | 94 | 0.38 | ○ | X | ○ | 1034 | 18.4 | 19026 | Example |
| 40 | 96 | 0.35 | ○ | X | ○ | 1022 | 19.5 | 19929 | Example |
| 41 | 97 | 0.44 | ○ | X | ○ | 1013 | 18.2 | 18437 | Example |
| 42 | <u>0</u> | <u>0.65</u> | ○ | X | ○ | 1026 | 18.4 | 18878 | Comparative example |
| 43 | 98 | 0.24 | ○ | ○ | ◎ | 1224 | 17.5 | 21420 | Example |
| 44 | 98 | 0.23 | ○ | ○ | ◎ | 1016 | 19.4 | 19710 | Example |
| 45 | 97 | 0.22 | ○ | ○ | ◎ | 1003 | 20.1 | 20160 | Example |
| 46 | 96 | 0.18 | ○ | ○ | ◎ | 1122 | 19.6 | 21991 | Example |
| 47 | 99 | 0.26 | ○ | ○ | ◎ | 1088 | 19.0 | 20672 | Example |
| 48 | 98 | 0.27 | ○ | ○ | ◎ | 1172 | 17.4 | 20393 | Example |
| 49 | 98 | 0.22 | ○ | ○ | ◎ | 1012 | 19.5 | 19734 | Example |
| 50 | 97 | 0.24 | ○ | ○ | ◎ | 1044 | 19.8 | 20671 | Example |
| 51 | 98 | 0.26 | ○ | ○ | ◎ | 1026 | 21.0 | 21546 | Example |
| 52 | 99 | 0.23 | ○ | ○ | ◎ | 1033 | 18.3 | 18904 | Example |
| 53 | 98 | 0.22 | ○ | ○ | ◎ | 1076 | 17.6 | 18938 | Example |
| 54 | 99 | 0.20 | ○ | ○ | ◎ | 1027 | 18.2 | 18691 | Example |
| 55 | 97 | 0.24 | ○ | ○ | ◎ | 1045 | 19.9 | 20796 | Example |
| 56 | 98 | 0.23 | ○ | ○ | ◎ | 1035 | 19.8 | 20493 | Example |

Underline indicates outside the scope of the present invention

TABLE 4

| | | | | Reduction annealing | | | | | | | | | | |
|---|---|---|---|---|---|---|---|---|---|---|---|---|---|---|
| | | | | Heating zone | | | Soaking zone | | | | | | Cooling zone | |
| | | Steel | | Cold-rolling | High dew point control starting | | | Furnace internal | | | | Soaking | Amount of internal | Cooling |
| No. | Symbol | Si (%) | Mn (%) | reduction (%) | temperature (°C.) | $H_2$ (%) | Dew point (°C.) | temperature (°C.) | $H_2$ (%) | Dew point (°C.) | Soaking time (s) | temperature (°C.) | oxidation (g/m²) | speed (°C./sec) | $H_2$ (%) |
| 57 | F | 0.8 | 1.9 | 50 | 450 | 5 | 0 | 860 | 5 | 0 | 20 | 860 | 0.09 | 15 | 5 |
| 58 | F | 0.8 | 1.9 | 50 | 550 | 5 | 0 | 860 | 5 | 0 | 20 | 860 | 0.08 | 15 | 5 |
| 59 | F | 0.8 | 1.9 | 50 | 650 | 5 | 0 | 860 | 5 | 0 | 20 | 860 | 0.09 | 15 | 5 |
| 60 | F | 0.8 | 1.9 | 50 | 650 | 10 | 0 | 860 | 10 | 0 | 20 | 860 | 0.09 | 15 | 10 |
| 61 | F | 0.8 | 1.9 | 50 | 650 | 15 | 0 | 860 | 15 | 0 | 20 | 860 | 0.10 | 15 | 15 |
| 62 | F | 0.8 | 1.9 | 50 | 650 | 5 | -10 | 860 | 5 | -10 | 20 | 860 | 0.07 | 15 | 5 |
| 63 | F | 0.8 | 1.9 | 50 | 650 | 5 | -15 | 860 | 5 | -15 | 20 | 860 | <u>0.05</u> | 15 | 5 |
| 64 | F | 0.8 | 1.9 | 50 | 650 | 5 | 5 | 860 | 5 | 5 | 20 | 860 | 0.12 | 15 | 5 |
| 65 | F | 0.8 | 1.9 | 50 | 650 | 5 | 10 | 860 | 5 | 10 | 20 | 860 | 0.14 | 15 | 5 |
| 66 | K | 0.8 | 2.0 | 50 | 650 | 5 | 0 | 860 | 5 | 0 | 20 | 860 | 0.27 | 15 | 5 |
| 67 | N | 0.8 | 1.9 | 50 | 650 | 5 | 0 | 860 | 5 | 0 | 20 | 860 | 0.19 | 15 | 5 |

| | Coating | | | Ca/Mg ratio in coating upper layer (%) | Most frequent value of maximum corrosion depth after joint corrosion resistance test (mm) | Corrosion resistance after advanced processing | | | | | | |
|---|---|---|---|---|---|---|---|---|---|---|---|---|
| No. | Composition (symbol) | Amount of coating (g/m²) | Coating appearance | | | 90° C. bending | 2T bending | Corrosion resistance after advanced processing | TS (MPa) | EI (%) | TS × EL | Note |
| 57 | d | 40 | ○ | 94 | 0.18 | ○ | ○ | ◎ | 1018 | 18.9 | 19240 | Example |
| 58 | d | 40 | ○ | 91 | 0.20 | ○ | ○ | ◎ | 1022 | 19.3 | 19725 | Example |
| 59 | d | 40 | ○ | 94 | 0.14 | ○ | ○ | ◎ | 1019 | 18.6 | 18953 | Example |
| 60 | d | 40 | ○ | 93 | 0.20 | ○ | ○ | ◎ | 1026 | 19.1 | 19597 | Example |
| 61 | d | 40 | ○ | 94 | 0.17 | ○ | ○ | ◎ | 1018 | 18.2 | 18528 | Example |
| 62 | d | 40 | ○ | 94 | 0.19 | ○ | ○ | ◎ | 10.21 | 18.2 | 18582 | Example |
| 63 | d | 40 | <u>X</u> | — | — | X | X | X | — | — | — | Comparative example |
| 64 | d | 40 | ○ | 94 | 0.19 | ○ | ○ | ◎ | 1016 | 18.8 | 19101 | Example |
| 65 | d | 40 | ○ | 93 | 0.20 | ○ | ○ | ◎ | 1027 | 17.5 | 17973 | Example |

TABLE 4-continued

| 66 | d | 40 | ○ | 93 | 0.24 | ○ | ○ | ◎ | 1091 | 19.5 | 21275 | Example |
| 67 | d | 40 | ○ | 93 | 0.22 | ○ | ○ | ◎ | 1042 | 19.6 | 20423 | Example |

Underline indicates manufacturing conditions outside the scope of the present invention Tables 1 to 4 show that the Examples provided a hot-dip Al—Zn coated steel sheet having an excellent coating appearance. The tables also show that the most frequent value of the maximum corrosion depth in the 150 corrosion resistance test cycles was less than 0.5 mm, indicating excellent joint corrosion resistance. The tables also show that the Examples provided a hot-dip Al—Zn coated steel sheet having high corrosion resistance after advanced processing. Depending on the steel composition and the annealing conditions, a hot-dip Al—Zn coated steel sheet having excellent mechanical characteristics can be manufactured. Because of insufficient pre-oxidation, Comparative Examples Nos. 10 and 17 could not undergo internal oxidation even through reduction annealing and underwent the surface enrichment of oxidizable elements, thus resulting in the formation of an uncoated portion and poor coating appearance. No. 63 also could not undergo sufficient internal oxidation and underwent the surface enrichment of oxidizable elements, thus resulting in the formation of an uncoated portion and poor coating appearance. Nos. 10, 17, and 63 had an amount of internal oxidation of less than 0.06 g/m² and consequently had poor corrosion resistance after advanced processing.

INDUSTRIAL APPLICABILITY

A hot-dip Al—Zn coated steel sheet according to the present invention has excellent coating appearance, joint corrosion resistance, and corrosion resistance after advanced processing. In particular, a hot-dip Al—Zn coated steel sheet according to the present invention applied to high-strength steel can be utilized as a surface-treated steel sheet for decreasing the weight and increasing the strength of automobile bodies. In addition to automobiles, a hot-dip Al—Zn coated steel sheet according to the present invention can be used in a wide variety of fields, such as household electrical appliances and construction materials, as a surface-treated steel sheet in which rust prevention is imparted to the material steel sheet.

The invention claimed is:

1. A hot-dip Al—Zn coated steel sheet that includes an Al—Zn coating layer having an Al content in the range of 20% to 95% by mass on a surface of the steel sheet, wherein the Al—Zn coating layer contains 0.01% to 10% by mass of Ca, the coating layer having equal parts in a thickness direction with one part nearer an outer surface of the coating layer and one part nearer the steel sheet, wherein the Ca is present in a greater amount in the part of the coating layer nearer the outer surface of the coating layer, and wherein a steel sheet surface layer within 100 μm from a surface of the base steel sheet directly under the Al—Zn coating layer contains 0.06 to 1.0 g/m² per surface of an oxide of at least one selected from Fe, Si, Mn, Al, P, B, Nb, Ti, Cr, Mo, Cu, and Ni in total.

2. The hot-dip Al—Zn coated steel sheet according to claim 1, wherein the mass ratio of Ca to Zn (Ca/Zn) in the Al—Zn coating layer is 0.5 or less.

3. The hot-dip Al—Zn coated steel sheet according to claim 1, wherein the Al—Zn coating layer has a Zn content of 10% by mass or more.

4. The hot-dip Al—Zn coated steel sheet according to claim 1, wherein the Al—Zn coating layer has an Al content in the range of 45% to 85% by mass.

5. A hot-dip Al—Zn coated steel sheet that includes an Al—Zn coating layer having an Al content in the range of 20% to 95% by mass on a surface of the steel sheet, wherein the Al—Zn coating layer contains 0.01% to 10% by mass of Ca and Mg in total, wherein the mass of Ca is greater than zero and the mass of Mg is greater than zero, the coating layer having equal parts in a thickness direction with one part nearer an outer surface of the coating layer and one part nearer the steel sheet, wherein the Ca and Mg are present in a greater amount in the part of the coating layer nearer the outer surface of the coating layer, and wherein a steel sheet surface layer within 100 μm from a surface of a base steel sheet directly under the Al—Zn coating layer contains 0.06 to 1.0 g/m² per surface of an oxide of at least one selected from Fe, Si, Mn, Al, P, B, Nb, Ti, Cr, Mo, Cu, and Ni in total.

* * * * *